Patented Sept. 3, 1946

2,406,971

UNITED STATES PATENT OFFICE 2,406,971

LUBRICANT AND PROCESS OF LUBRICATING SURFACES THEREWITH

Frank J. Sowa, Cranford, N. J.

No Drawing. Application May 16, 1942,
Serial No. 443,303

6 Claims. (Cl. 252—49.6)

The invention relates in general to actuating fluids and in particular to lubricants and hydraulic fluids comprising organic silicon compounds and including correlated improvements designed to enhance their characteristics and extend their field of use.

This application is a continuation-in-part of my co-pending application Serial No. 300,555 filed October 21, 1939.

Actuating fluids of the class of lubricants and hydraulic fluids must be characterized by a combination of correlated physical characteristics in order to be useful over a wide range of temperature and in a wide variety of apparatus. The properties of an actuating fluid which are of most importance are its viscosity, its oiliness, and its surface tension, and other characteristics which influence the use of the fluid are the pour point, corrosive properties, flash point, vapor pressure, carbon residue, and the like. In my copending U. S. application Serial No. 300,555 filed October 21, 1939, I have disclosed for the first time a fluid adapted for use as a lubricant or hydraulic fluid comprising a hydrolysis product of an organic silicane and the polymers of such hydrolysis products. In said prior application, these compounds are claimed alone and in admixture with hydrocarbon oils which are themselves characterized by having some degree of oiliness, and a sufficient viscosity and surface tension to render them classifiable as lubricants.

The present application is concerned with compositions comprising said organic silicon compounds used in compatible admixtures with organic liquids which are themselves incapable of use alone as a lubricant or a hydraulic fluid because they fail to possess one or more of the essential characteristics above mentioned, such as a sufficient viscosity, suitable oiliness, and a proper surface tension, as well as the other qualities above described. For example, it has been found that while viscosity is an important characteristic of an actuating fluid, oiliness has an equally important effect upon its efficiency. Oiliness may be described as the body of an oil and is not distinguished by such tests as viscosity, specific gravity, and the like.

Accordingly, it is a general object of the present invention to produce an actuating fluid having those correlated characteristics and properties which are essential in such fluids while employing an organic liquid which, when used alone, is deficient in one or more of said characteristics.

It is another object of the invention to convert a non-lubricating organic liquid into a lubricant having a relatively low viscosity change over a wide range of temperature, a proper surface tension, a low coefficient of friction, and a substantial oiliness.

It is another object of the invention to provide a hydraulic fluid having a low pour point, that is, the ability to remain fluid at low temperatures and which will have a relatively low vapor pressure, and a suitable viscosity index.

Other objects of the invention will in part be obvious and will in part appear hereinafter.

According to the present invention, actuating fluids having novel characteristics satisfying the above objects comprise a compatible admixture of a non-lubricating, substantially neutral organic liquid and an organic silicon compound selected from the class of hydrolysis products and polymers of said hydrolysis products.

The silicon hydrolysis products employed in the lubricant of the invention are compounds resulting from the hydrolysis of silicanes or organic silicon compounds having the following general formula:

$$R_ySiM_z$$

in which R is a saturated or unsaturated organic radical. As previously mentioned M is a halogen atom or an —OR' group, $y$ has a value of 1 or 2, $z$ has a value of 2 or 3, the sum of $y$ and $z$ being not greater than 4 and the remaining silicon valences, if any, being occupied by hydrogen. Both R and R' may be an organic radical, such, for example, as an alkyl, an aryl, an alkaryl or an aralkyl group. The products of the hydrolysis of the organic silicon compounds according to the present invention include silicols, such, for example, as compounds of the type $(R_x—SiOH)_n$, silicyl ethers, such for example, as compounds of the type of , silicones, such for example, as compounds of the type of $(R_x—SiO)_n$ in all of which compounds $x$ has the value 1, 2 or 3 and $n$ has a value of 2, 3 or more, and R is a saturated or unsaturated organic radical, such, for example, as an alkyl, an aryl, an alkaryl or an aralkyl group. The organic silicon polymers of the invention are compounds resulting from the continued hydrolysis of the compounds $R_ySiM_z$ just described and may be dimers, trimers, or higher polymers, but in every case they are compounds containing two or more silicon atoms linked through oxygen. The polymers of the invention appear to comprise linear and cyclic compounds of the following types:

(a) 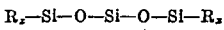

(b) 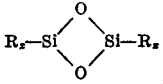

(c) 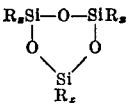

in which $x$ is 1, 2 or 3 depending upon the free valences of silicon.

In all the formulae above given, it is to be understood that any silicon valences not shown occupied are to be considered as occupied by hydrogen.

By way of illustrating but not by way of limiting the invention, the new series of silicon polymers will be illustrated by hydrolysis of the mono-alkyl-alkoxy silicanes, and mono-alkyl halo-silicanes, but the invention is not limited to the products resulting from the hydrolysis of such compounds. Such silicanes may be prepared by any suitable reaction known to those skilled in the art, such, for example, as by the so-called Grignard reaction, or by allowing sodium to act upon a mixture of alkyl halide and silicon halide:

$$2Na + RX + XSi(X)_3 \rightarrow 2NaX + R-SiX_3$$

The Grignard reagent employed may be any suitable alkyl metal halide such, for example, as methyl magnesium chloride, ethyl aluminum bromide or propyl zinc iodide and the like. The Grignard reagent is allowed to act upon a silicon compound in such an amount that the silicane resulting from the reaction contains at least one alkyl group, as shown in the equation:

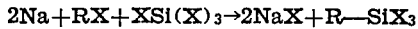

The silicon compounds should be those in which the groups attached to the silicon are capable of being spit off by hydrolysis after the Grignard reaction as hereinafter described. Suitable silicon compounds are tetra- or tri-halosilicanes, or tetra- or tri-alkoxyl silicanes or mixed halo alkyoxy silicanes, such, for example, as monofluortrialkoxysilicane, dibrom-dialkoxy-silicane, trichlorosilicane, tetrachlorsilicane, tetrafluorosilicane, and the like, and organic silicates (silicic acid esters) such as the mono-, di-, tri-, or tetra-alkoxy silicanes, for example, di-ethyl silicates, and tri-ethyl silicates, tetra-methyl silicates, and the like.

When the alkyl alkoxyl silicanes or the alkyl-halo-silicanes are treated with water, preferably in the presence of a suitable catalyst, hydrolysis occurs and an oxygen-containing silicon polymer is formed. For the catalyst an acid or a base may be employed, such, for example, as sulfuric acid, hydrochloric acid, nitric acid or sodium hydroxide, potassium hydroxide and ammonium hydroxide. The silicon derivative may be heated with water at a temperature of from 30° to 100° C. Heat, although not necessary, will accelerate the reaction. In fact, in the presence of water without any additional catalyst, heat alone will usually cause the reaction to occur, although only slowly. The time required, with or without a catalyst, varies with the compounds used and the extent of the hydrolysis desired.

As a result of the initial hydrolysis, silicols, silicones, silicyl ethers, and polymers thereof are formed. Under continued hydrolysis conditions preferably with heating, the polymerization may be continued to a much greater extent. Continued heating is the easiest and simplest means of continuing the polymerization, although other methods, such as increasing the pressures above atmospheric pressure, for instance, to pressures of from 15 to 1000 pounds per square inch, will serve the same purpose by enabling the temperature to be increased. The polymers range from dimers and trimers to very large polymers and their properties vary accordingly. Among other properties, as the size of the molecules is increased, their viscosity and boiling points increase. According to the degree of polymerization and the nature and number of the alkyl group substituted, the products of the hydrolysis vary from thin liquids to viscous. In general the polymers are liquids, have high flash points, low vapor pressure, a specific gravity of about one or less and a low chill point, in some cases as low as —90° F. and in many cases below —30° F.

The hydrolysis products and polymers are used in the present invention in compatible admixture with an organic liquid selected from one of the following classes:

1. Liquid aliphatic hydrocarbons, such, for example, as diamylene, naphtha, kerosene, and the like.

2. Liquid aromatic hydrocarbons, such, for example, as benzene, toluene, xylene, and the like.

3. Liquid halogenated hydrocarbons, either aliphatic or aromatic, such, for example, as ethylene dichloride, propylene dichloride, mono-chlorobenzene, trichloroethylene, chlorotoluene, chloroxylene, and the like.

4. Liquid nitro derivatives of the hydrocarbons, either aliphatic or aromatic, such, for example, as the liquid nitro paraffins, nitro benzene, nitro toluene, di-nitro benzene, and the like.

5. Liquid aliphatic alcohols having three or more carbon atoms, such, for example, as butyl alcohol, propyl alcohol, amyl alcohol, and polyhydric alcohols and their derivatives having 4 or more carbon atoms, such, for example, as sorbitol, diethylene glycol, and monomethyl ether of ethylene glycol.

6. Liquid aromatic hydroxy compounds, such, for example, as phenol, resorcinol, catechol, xylol, and the like.

7. Liquid ethers of any of the aliphatic alcohols of the class recited in #5.

8. Ketones derived from any of the alcohols recited in class #5.

9. Esters derived from any of the alcohols recited in class #5, including esters of higher fatty acids, such, for example, as esters of resinolic acid, and abietic acid, linolic acid, and the like, liquid primary, secondary, and tertiary amines, hydroxy amines and carboxy amines, such, for example, as dimethylamine, tetra-amine, monomethylamine, triethanolamine, and the like.

All of the organic compounds above mentioned are characterized by being (a) liquids, (b) inherently non-oily or non-lubricating when used alone, and (c) substantially neutral or non-corrosive with respect to metals.

The expression "compatible admixture" as used in the specification and appended claims is intended to mean that the organic liquid and organic silicon compound are miscible to a substantial extent. Generally speaking, if 1% or more of the organic silicon compound will dissolve in the organic liquid, the resulting mixture will be suitable for use in the present invention, although in the now preferred embodiment, there is used a compatible admixture comprising from 5 to 50% of the organic silicon compound and the remainder the organic liquid. It is to be understood that the relative proportions of the organic silicon compound and the organic liquid may be varied to give the proper correlation of viscosity, specific gravity, oiliness, and other properties that are required for the intended use. Generally speaking, when the fluids are intended to be used as lubricants, the proportion of the organic silicon compound is increased over that employed when the mixture is to be used as a hydraulic fluid.

The expression "actuating fluid" as used in the specification and appended claims is used in its commonly accepted generic sense to include both lubricants and hydraulic fluids. Hydraulic fluids may be defined as fluids employed in apparatus where force is to be transmitted by means of a body of liquid as in hydraulic brakes, hydraulic pressure guages, hydraulic pressure hammers, hydraulic lifting jacks, hydraulic-actuated presses, and molding equipment. Because of their low pour point and their low viscosity over a wide range of temperature, the composition of the present invention is particularly adapted for use in airplanes, refrigerators, or other equipment which is subjected to a wide range of temperature.

The actuating fluids of the present invention may also be used as lubricants. Thus the present invention provides a process for lubricating relatively moving surfaces by maintaining between such surfaces a film of lubricant comprising a compatible admixture of a non-lubricating organic liquid and a hydrolysis product of an organic silicane or of a polymer of such hydrolysis products. The moving surfaces thus lubricated may be both metallic, or one of them may be non-metallic, or both surfaces may be non-metallic.

The actuating fluids of the present invention are characterized by having a low viscosity over a wide range of temperature, a high surface tension, a low coefficient of friction, and a substantial oiliness of body as compared with the organic liquid when tested alone for these properties. Accordingly, by the present invention it is possible to convert a non-lubricating oil into a lubricant having a novel combination of valuable properties and characteristics by admixing with such organic liquid a suitable proportion of a hydrolysis product of an organic silicane or of a polymer of such hydrolysis products. Thus a wide variety of new actuating fluids, both lubricants and hydraulic fluids, is obtainable.

By way of illustration but not by way of limiting the invention, the following specific examples will be given:

Example I

A viscous oily polymer was prepared by hydrolyzing monoamyl-trichlorosilicane and removing the water used and formed in the reaction. This product can also be made in other ways, for example, by the hydrolysis of a monoamyl trialkoxysilicane. The viscosity of this polymer can be varied somewhat by varying the conditions during hydrolysis and the temperature used to remove and heat the polymer in its final stages of preparation. The viscosity of the polymer formed in the present case was 400 Saybolt universal seconds at 210° F. and 2500 S. U. V. at 100° F., which is a very excellent viscosity curve for an oil with such high viscosity.

Five parts by volume of this oily silicon polymer were mixed with 5 parts by volume of mesityl oxide. The resulting fluid had a pour point below 50° F. This fluid exhibited a lubricating quality with a very small change in viscosity per degree change in temperature; i. e., it has a high viscosity index which is desirable as a dash pot fluid to actuate mechanisms by fluid transmission in hydraulic systems.

Example II

Three parts by volume of the organo-silicon polymer formed from the hydrolysis of monoamyl trichlorosilicane as described in Example I above was mixed with 7 parts by volume of methyl amyl ketone. The resulting fluid had desirable lubricating properties, a low pour point and a high viscosity index.

Example III

Twenty-five parts by volume of the monoamyl silicon polymer formed by the hydrolysis of monoamyl trimethoxysilicane as described in Example I above was dissolved in 75 parts by volume of amyl alcohol. This fluid swelled natural rubber somewhat but had very little effect upon neoprene synthetic rubber. It also had a low pour point and reasonably good lubricating properties.

Example IV

The process of Example III was repeated except that 75 parts of kerosene were used in place of the alcohol. This gave a hydraulic fluid which had a very high viscosity index. This experiment was again repeated using diamylene and higher polymers of amylene. The product was again one which had a very high viscosity index, i. e., very low change in viscosity per degree change in temperature.

Example V

The process of Example III was repeated except that 50 parts of the monoamyl silicon polymer were used, which was mixed with 50 parts of ethyl cellosolve. The resulting product had a flat viscosity curve, a low pour point, good lubricating properties, and did not greatly affect the swelling of synthetic rubber such as neoprene, or natural rubber.

Example VI

The process of Example III was repeated using 75% of monoamyl-silicon polymer and 25 parts of trichlorethylene. The product is a lubricant having an excellent pour point and viscosity index.

Example VII

An oily organo-silicon polymer was prepared by hydrolyzing diethyl or dimethyl-dichlorosilicane and removing the water used in the hydrolysis as well as that formed in the reaction. This product can be used directly as prepared or it can be further purified and separated into various fractions by distillation under reduced pressure.

Fifty parts of this oily organo-silicon polymer were mixed with 50 parts by volume of diamyl phenol. The resulting product had a very low pour point, good lubricating properties and a low change in viscosity per degree change in temperature.

Example VIII

Eight parts of the monoamyl-silicon polymer or the dialkyl silicon polymer was mixed with 2 parts of either toluene or xylene. The resulting fluid had good lubricating properties and was well adapted for low temperature lubricants.

*General example*

The above experiments, in which the mono-amyl-silicon polymer was used, were repeated using the dimethyl and diethyl silicon polymers. It is also found to be an advantage in some cases to use the trialkyl silicols along with the various diluents or solvents as low temperature hydraulic-type fluids.

Having described my invention, what I claim as new and desire to secure by Letters Patent is:

1. A lubricant comprising a non-lubricating organic liquid and an organic silicon compound selected from the class of hydrolysis products of organic silicanes and polymers of said hydrolysis products, said organic silicon compound being present in an amount sufficient to impart lubricating properties to said liquid.

2. A lubricant comprising a mixture of a non-lubricating, substantially neutral organic liquid and an organic silicon compound selected from the class of hydrolysis products of organic silicanes and polymers of said hydrolysis products, said organic silicon compound being present in an amount sufficient to impart lubricating properties to said liquid.

3. A lubricant comprising a mixture of a non-lubricating organic liquid and from 5 to 50% by weight of an organic silicon compound selected from the class of hydrolysis products of organic silicanes and polymers of said hydrolysis products.

4. A process of lubricating relatively moving surfaces comprising maintaining between said surfaces a film of a lubricant comprising a mixture of a non-lubricating organic liquid and an organic silicon compound selected from the class of hydrolysis products of organic silicanes and polymers of said hydrolysis products, said organic silicon compound being present in an amount sufficient to impart lubricating properties to said liquid.

5. A process of lubricating relatively moving surfaces comprising maintaining between said surfaces a film of a lubricant comprising a mixture of a non-lubricating, substantially neutral organic liquid and an organic silicon compound selected from the class of hydrolysis products of organic silicanes and polymers of said hydrolysis products, said organic silicon compound being present in an amount sufficient to impart lubricating properties to said liquid.

6. A process of lubricating relatively moving surfaces comprising maintaining between said surfaces a film of a lubricant comprising a mixture of a non-lubricating organic liquid and from 5 to 50% by weight of an organic silicon compound selected from the class of hydrolysis products of organic silicanes and polymers of said hydrolysis products.

FRANK J. SOWA.